FIG. 1

INVENTOR
S. T. BREWER
BY
*S. Stoddard*
ATTORNEY

3,330,123
EQUIPMENT FOR LAYING REPEATERS CONNECTED IN OCEAN COMMUNICATION CABLE
Sherman T. Brewer, Chatham Township, Morris County, N.J., assignor to Bell Telephone Laboratories, Incorporated, New York, N.Y., a corporation of New York
Filed Sept. 8, 1964, Ser. No. 394,783
12 Claims. (Cl. 61—72.3)

This invention relates to a method and apparatus for launching repeaters which are connected at spaced intervals in an ocean communication cable and, more particularly, to a method and apparatus for conveying a repeater from the deck of a cable-laying ship to the ocean floor at the same rate of descent as an equivalent length of the cable in which it is connected. The invention is especially useful when it is applied to the process of launching repeaters which are connected in ocean cable of the armorless type.

As is well known in the art, underwater, or ocean, communication cable is usually provided with many enlargements or lumps which are connected integrally therein at spaced intervals along its length by any convenient method, such as by splicing. The spacing between the lumps varies with the particular type of cable and may be fifty miles in some cases and ten miles in other instances. These lumps are constituted by instrumentality housing structures which contain electronic instrumentalities forming such equipment as repeaters or equalizers. The lump-type housing structures are usually several feet in length and their diameter is generally considerably greater than the diameter of the cable. For example, a recently developed armorless cable has a diameter of approximately one inch and is equipped with repeaters each having a diameter of approximately twelve inches and a weight of about five hundred pounds.

For the purpose of convenience in the following description, these lump-type instrumentality housing structures are referred to simply as repeaters. This should not be interpreted as limiting the application of the invention to only repeaters because the invention is equally applicable to housing structures which contain equalizers or other useful instrumentalities.

When an ocean communication cable is being laid, considerable care is usually taken during the cable-laying process to insure that a desired degree of slack in the cable is maintained to enable the cable to conform properly to irregularities, particularly depressions, in the contour of the ocean floor. The reason for this is that, when the cable is laid in this manner, it is less apt to be caught by trawling gear operated from fishing boats.

Formerly, most ocean communication cable was of the armored type having a heavy external protective sheath or armor comprising, for example, a multiplicity of spirally wrapped layers of steel wire. The substantial weight of this armor caused the cable to sink rapidly after it had been payed out from a cable-laying ship into the ocean. By properly correlating the pay-out rate with the speed of the ship, the desired degree of slack could be obtained.

Recently developed ocean communication cable differs from the armored cable described above in that its outer protective covering is formed of a suitable plastic material, such as polyethylene. Since it is not provided with an armored protective sheath, this new type of cable is known as armorless cable. Due to the use of plastic material instead of layers of steel wire, this new type of cable is considerably lighter in weight than armored cable and tends to sink much more slowly when it is payed out into the ocean. As was stated above, the repeaters which are connected into an armorless cable are relatively dense with respect to the cable and, for this reason, the slow sinking rate of the cable creates a problem in maintaining the desired degree of slack in a cable that is being laid.

This problem arises from the fact that, since the weight of a repeater is heavy in comparison with the weight of the armorless cable, a repeater will sink much more rapidly than the cable. For example, tests have shown that a repeater sank at a rate that was eight times faster than the sinking rate of its associated armorless cable. This faster rate of descent causes a repeater to pull toward it a portion of the adjoining slack cable that has just been payed out. As a result, this section of the cable will not conform to the contour of the ocean floor because it will be pulled up out of depressions and will be stretched taut above them. This is undesirable because it renders the cable susceptible to being caught by trawling gear operated from fishing boats. Another undesirable result is that the rapid descent of a repeater is liable to produce a severe impact when the repeater strikes the ocean floor and the shock resulting from this impact might damage the electronic components in the repeater.

Accordingly, an object of this invention is to provide improved means for maintaining a desired degree of slack in a cable that is being laid.

Another object of this invention is to provide improved means for regulating the rate of descent of a repeater through a body of water so that it will sink at the same rate as a communication cable to which it is connected.

A further object of the invention is to provide an improved method and means for conveying a relatively heavy repeater to the ocean floor without producing an appreciable impact when the repeater arrives at the ocean floor.

An additional object of the invention is to provide an improved method and means for conveying a repeater from a ship to the ocean floor without interrupting the continuity of the cable-laying process and without reducing the pay-out speed of the cable.

A more specific object of the invention is to provide means for automatically varying the effective area of a parachute so that its drag force can be adjusted for the purpose of regulating the sinking rate of a repeater attached thereto.

These and other objects of the invention are attained by providing a parachute for each repeater. Each parachute functions in the manner of a brake by providing a drag force for retarding the rate of descent of its associated repeater. In addition, each parachute is of such a size and is so constructed as to cause its associated repeater to sink at the same rate of descent as an equivalent length of the associated cable.

Due to various factors, such as changeable ocean currents, it is difficult to design a parachute which will, under variable conditions, provide the exact drag force that is required to retard a repeater so that its descent rate will precisely match the descent rate of the associated cable. For this reason, each parachute is supplied with regulating means for controlling its drag force by varying its effective area. In addition, operating means are provided for automatically adjusting the regulating means in accordance with fluctuations in the relative positions of the repeater and the associated cable during their descent in the water. Before a parachute and its associated repeater are launched, or overboarded, into the water, the parachute is furled inside a protective jacket which is coupled to the associated cable in such a manner as to enable the parachute to accompany its repeater when the cable is payed out by a cable-handling engine.

These and other features of the invention are more fully discussed in connection with the following detailed description of the drawing in which.

Figure 1:
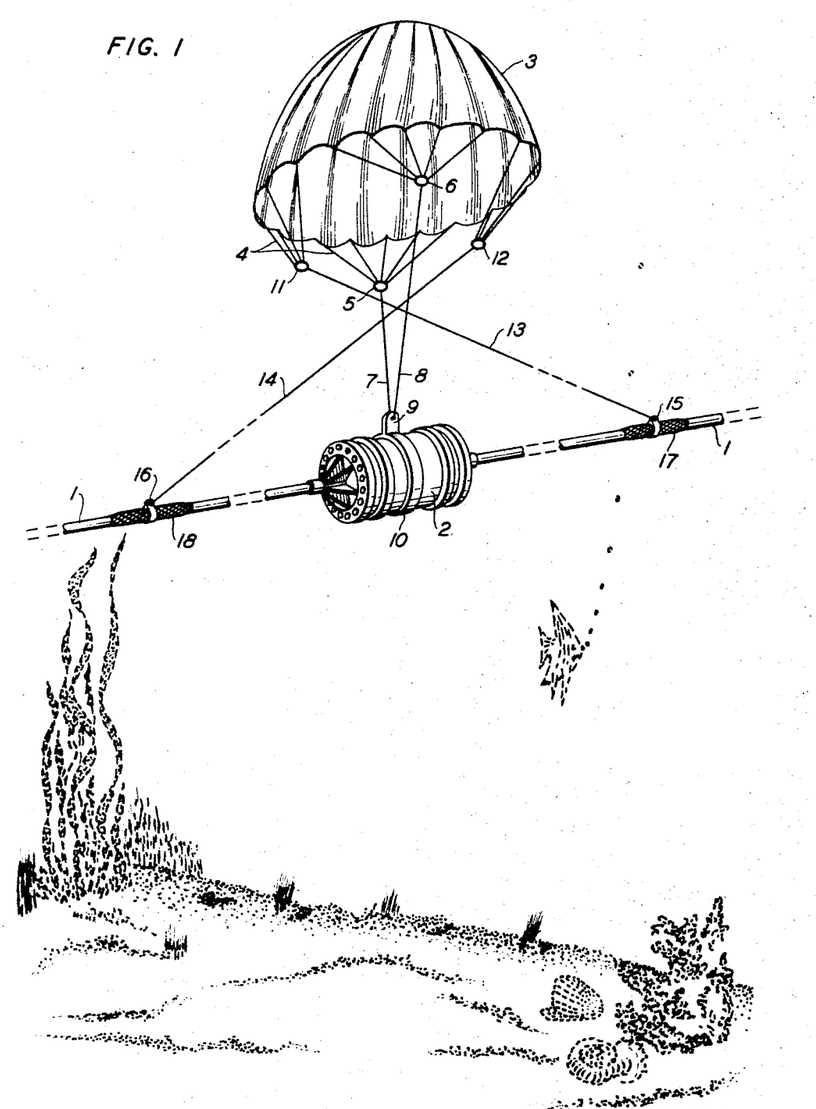
FIG. 1 is a pictorial representation of a simplified basic embodiment of the invention showing a parachute supporting a repeater and coupled to adjacent portions of an underwater communication cable.

In the illustrative embodiment of the invention shown in FIG. 1, an armorless underwater communication cable 1 is represented as having a repeater 2 connected integrally therein. As was stated above, a number of similar repeaters are also connected into the cable 1 with a spacing between them of from ten to fifty miles. Each repeater 2 may be of the type disclosed in Patent 2,871,283 issued Jan. 27, 1959, to F. R. Dickinson. Since each repeater 2 is heavy in comparison with the cable 1, a number of parachutes 3 are provided for conveying the repeaters 2 during their descent through the water to the ocean floor. Each parachute 3 functions as a brake for retarding the rate of descent of its associated repeater 2.

However, the purpose of this invention is not merely to retard the sinking rate of each repeater 2. Specifically, a principal object of the invention is to cause each parachute 3 to convey its associated repeater 2 at the same rate of descent as that of the cable 1 even under variable conditions, such as those caused by changeable ocean currents. This object is accomplished by equipping each parachute 3 with regulating means comprising rigging that is coupled to both the cable 1 and the associated repeater 2 in such a manner that the effective area of the parachute 3 can be automatically varied to adjust its drag force so that the rate of descent of the repeater 2 will match the rate of descent of the cable 1.

As is shown in FIG. 1, the parachute 3 is provided with rigging which includes a number of shrouds 4. The shrouds 4 in two oppositely disposed groups are joined to rings 5 and 6, respectively. Each ring 5 and 6 is coupled by a line 7 and 8, respectively, to a tab 9 secured to a strap 10 that is fastened around the center of the repeater 2. It is to be understood that the strap 10 is shown for the purpose of simplicity and that, if desired, its function of supporting the repeater 2 could be performed by a bridle or sling.

The shrouds 4 in another pair of oppositely disposed groups are joined to rings 11 and 12, respectively. These rings 11 and 12 are each coupled by lines 13 and 14, respectively, to tabs 15 and 16, respectively. The tabs 15 and 16 are located at opposite sides of the repeater 2 and are secured to adjacent portions of the cable 1 by any convenient means, such as a pair of grips 17 and 18 which may be of any suitable construction known to those skilled in the art. The grips 17 and 18 are made of suitable material and are designed to grip the cable 1 tightly when they are pulled by the lines 13 and 14. Each of the grips 17 and 18 is spaced apart from the repeater 2 by a distance, such as ten feet, that is sufficient to permit the repeater 2 to move up and down with respect to the grips 17 and 18 as will now be discussed. For the purpose of simplicity in the drawing, this spacing has been shortened and is not shown proportionally in any of the figures. However, it is to be understood that, in each of the figures where this spacing is shown, it actually has a suitable length such as that just mentioned.

The above-described equipment is represented in FIG. 1 as being in an ideal condition in which the repeater 2 is descending at the same rate as the cable 1. If the repeater 2 should begin to sink faster than the cable 1, then the repeater 2 would drop in relation to the grips 17 and 18. Also the lines 7 and 8 would drop along with the repeater 2 and would pull the shroud rings 5 and 6 downward in relation to the rings 11 and 12. The result of this action is that the rings 11 and 12 are now permitted to spread further apart by moving outward. This serves to increase the effective cross-sectional area of the parachute 3 thus producing an increase in its drag force. Accordingly, the rate of descent of the repeater 2 will be made slower until its sinking velocity becomes identical with that of the cable 1.

Conversely, if the repeater 2 should be sinking more slowly than the cable 1, then the repeater 2 would, in effect, rise above the grips 17 and 18. Also, the shroud rings 5 and 6 would move upward in respect to the rings 11 and 12. These movements will cause the shroud rings 11 and 12 to move inward and become closer together. This produces a reduction in the effective area of the parachute 3 so that its drag force will be correspondingly diminished. The effect of this is that the repeater 2 will now sink more rapidly until its sinking velocity becomes identical with that of the cable 1.

In this way, by alternatively increasing and decreasing the effective area of the parachute 3, the lines 7, 8, 13, and 14 function to regulate automatically the rate of descent of the repeater 2 so that it will match the rate of descent of the cable 1.

If desired, the tabs 9, 17, and 18 may be made of material which will corrode and disintegrate after a certain period of immersion in sea water. A suitable material for this purpose is magnesium alloyed with small percentages of aluminum, zinc, and manganese. When the tabs 9, 17, and 18 are made of this material, part of the alloy is covered with an appropriate insulating substance which is provided with an exterior coating of silver chloride.

The magnesium alloy functions in the manner of an anode, the silver chloride acts like a cathode, and the sea water serves as an electrolyte. The entire combination will perform similarly to a galvanic cell thereby producing anodic corrosion which will cause the tabs 9, 17, and 18 to disintegrate. This will uncouple the lines 7, 8, 13, and 14 from the repeater 2 and the cable 1 thus releasing the parachute 3. By initially affixing a small floatage device to the parachute 3 prior to the launching operation, the parachute 3 will now be enabled to rise to the surface of the water so that it can be received and salvaged.

Figure 2:
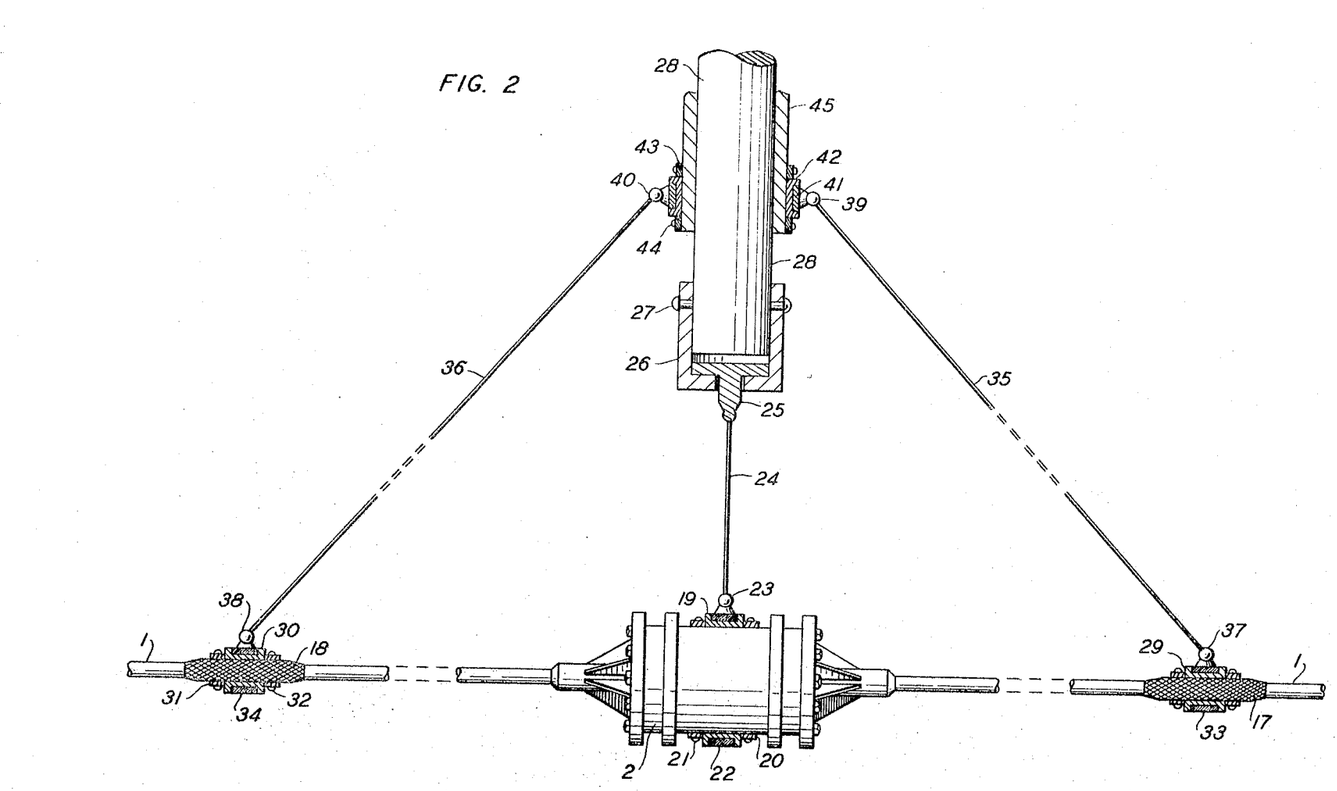
FIGS. 2 and 3 are partly in section and illustrate the manner in which bearing elements may be employed for the purpose of enabling the cable, repeater, and the parachute to rotate freely about their axes.

During the process of laying the cable and its repeaters 2, there may be occasions when the cable 1 and the repeaters 2 will rotate or twist about their axes. Since this action might foul or entangle the lines 7, 8, 13, and 14, it is desirable to attach them to free rotation devices or bearings. This may be accomplished in part by the construction illustrated in FIG. 2 which shows a repeater 2 connected integrally between two sections of a cable 1. In place of the strap 10 and tab 9 of FIG. 1, the central portion of the repeater 2 shown in FIG. 2 is encircled by a sleeve bearing 19. This sleeve bearing 19 is securely fastened to the repeater 2 by any convenient means, such as by providing it with side flanges 20 which are attached to the repeater 2 with screws 21. The sleeve bearing 19 is fabricated with a central channel which loosely accommodates and retains a collar 22 which is rotatable therein so that the repeater 2 and the bearing 19 can rotate freely within the collar 22 and independently of any rotation of the parachute 3.

In order for the parachute 3 to support the repeater 2, the collar 22 is provided with a fastening device 23 to which one end of a line, or wire, 24 is attached. The other end of the line 24 is secured to the bottom end of a bearing 25 which is loosely contained inside a cup 26 for rotation therein. This cup 26 is fastened by any suitable means, such as screws 27, to the lower end of a cylinder, or shaft 28. The shaft 28 extends upward toward the parachute 3 to which it is coupled in the manner indicated in FIG. 3. This construction, including the bearing 25, permits the repeater 2 to turn or rotate within a plane that is perpendicular to the plane of FIG. 2 without twisting the parachute shaft 28.

For the purpose of facilitating free axial rotation of the cable 1, the middle portion of each of the grips 17 and 18 is encircled by a sleeve bearing 29 and 30, respectively. The bearings 29 and 30 are fixedly attached to the cable 1 by means of side flanges 31 which are fixedly secured to the respectively associated grips 17 and 18 by any convenient means, such as rivets 32. The bearings 29 and 30 are made with circumferential channels which loosely contain rotatable collars 33 and 34, respectively. Due to this loose fit, the cable 1 and the grips 17 and 18 can rotate freely and independently within the collars 33 and 34.

The parachute 3 is coupled indirectly to the cable 1 by means of lines 35 and 36. As is shown in FIG. 2, the collars 33 and 34 are supplied with fastening devices 37 and 38, respectively, which are each attached to the lower end of a respectively associated one of the lines 35 and 36. The upper ends of the lines 35 and 36 are secured to similar fastening devices 39 and 40 which are mounted on a collar 41. This collar 41 is loosely supported by a channel formed in a sleeve bearing 42 which is provided with side flanges 43. By means of screws 44 passing through the flanges 43, the bearing 42 is fixedly attached to a cylindrical tube 45. This tube 45 loosely surrounds the shaft 28 so that the shaft 28 can freely rotate axially therein. Thus, the cable 1 can twist or turn in a plane that is perpendicular to the plane of FIG. 2 without interfering with the functions of the parachute 3.

Figure 3:
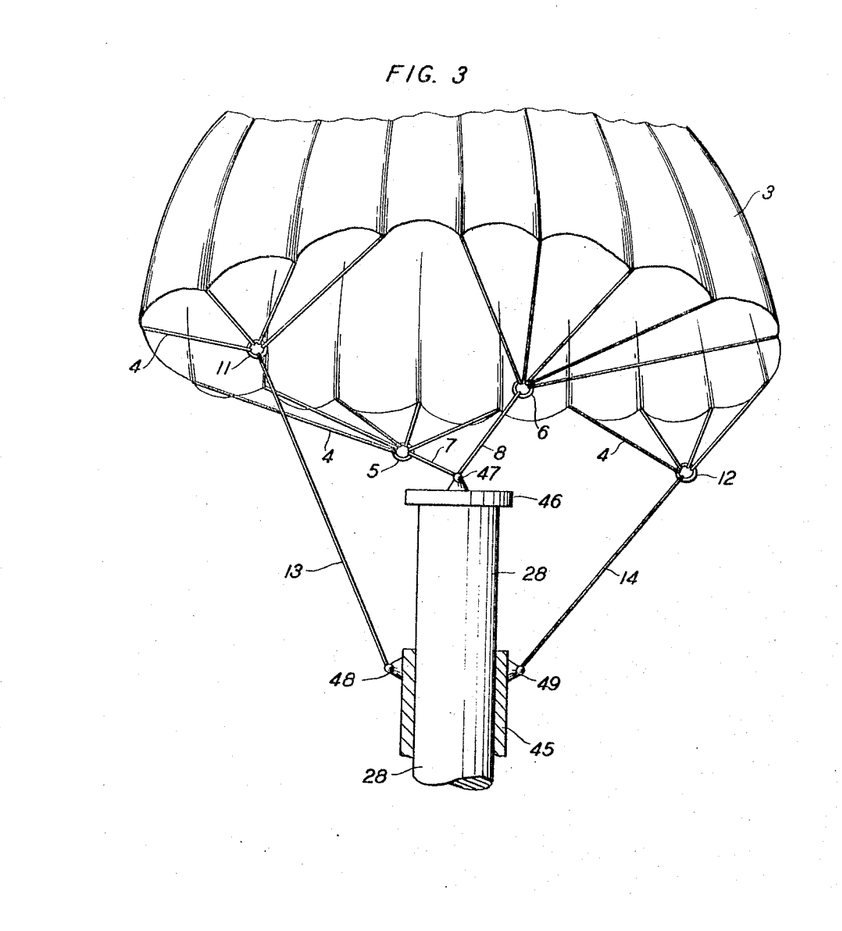

As was stated above, the shaft 28 is coupled to the parachute 3. This can be acomplished in any suitable manner, such as by attaching to its upper end a circular cap 46 having a fastening device 47 mounted at its center, as is shown in FIG. 3. The lines 7 and 8 that extend downward from the shroud rings 5 and 6, respectively, now have their lower ends secured to the fastener 47. In addition, the upper end portion of the tube 45 has two diametrically opposed fastening devices 48 and 49 attached thereto. The lines 13 and 14 that extend downward from the shroud rings 11 and 12 are now secured to the fasteners 48 and 49.

Since there is a loose fit between the tube 45 and the shaft 28, they are both free to move independently in an axial direction. If desired, any suitable type of bearing or lubricant may be placed internally between the shaft 28 and the tube 45 to facilitate their movement. This movement is limited in one direction when the top of the tube 45 abuts against the cap 46. Movement in the opposite direction is stopped when the bottom of the tube 45 engages the upper end of the cup 26. Thus, the shaft 28 and the tube 45 can move freely and independently of each other in response to any type of movement of the cable 1 and the repeater 2.

Figure 4:
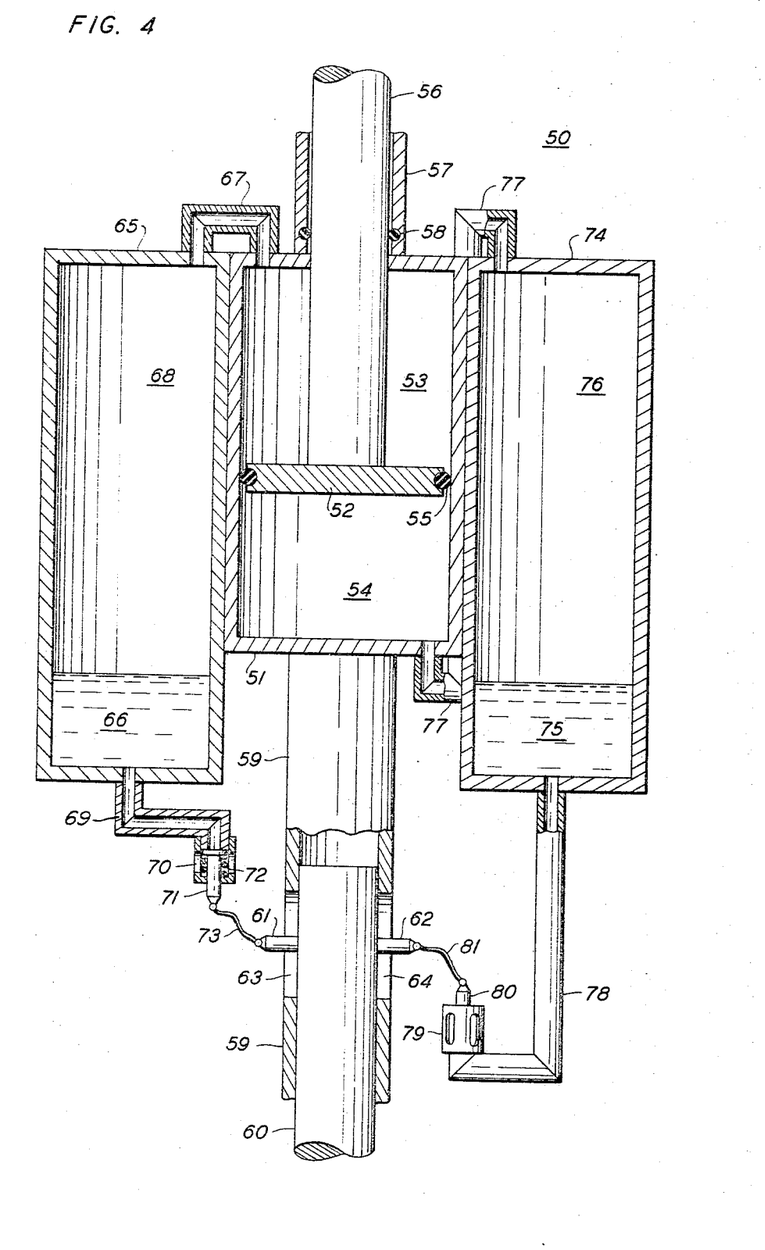
FIG. 4 is a sectional side view of one form of regulating means for controlling the drag force of the parachute by varying its effective area.

For the purpose of increasing the sensitivity of the repeater lowering device, it may be provided with sensing means for sensing the occurrence of any fluctuations in the relative positions of the repeater 2 and the cable 1 and for automatically adjusting the parachute regulating means. Such automatic adjusting means are illustrated in FIG. 4 which shows a pneumatic-hydraulic servo device 50 which is to be understood as being located between the top of the equipment shown in FIG. 2 and the bottom of the apparatus shown in FIG. 3 so that its input is coupled to the repeater 2 and its output is coupled to the parachute 3. The servo device 50 includes an air chamber 51 which is divided by a piston 52 into an upper portion 53 and a lower portion 54. The piston 52 is provided with suitable seals 55 which prevent the flow of air between the portions 53 and 54.

A rod, or shaft, 56 has its lower end attached to the center of the piston 52 while its upper end passes through an opening in the top of the chamber 51. This opening is covered by a tube 57 which surrounds the upper end of the piston rod 56 with sufficient clearance for the rod 56 to slide freely therein. The tube 57 is provided with internal seals 58 for preventing the escape of air from the upper air chamber 53. The top of the tube 57 is to be considered as being integrally connected to the bottom of the tube 45 shown in FIG. 3. Similarly, the top of the piston rod 56 is to be understood as being integrally joined with the bottom end of the shaft 28 shown in FIG. 3. Thus, the rod 56, which may be considered as being the output of the servo device 50, is coupled to the parachute 3.

The bottom of the air chamber 51 is attached to a tube 59 which loosely surrounds a shaft 60 which is free to slide up and down therein. This sliding movement is limited by two pins, or studs, 61 and 62 which are securely mounted on the shaft 60 in diametrical opposition. Each of the pins 61 and 62 protrudes through one of two similar slots 63 and 64, respectively, cut in the tube 59. Thus, the upward movement of the shaft 60 is halted when the pins 61 and 62 engage the upper ends of the slots 63 and 64. Likewise, the downward motion of the shaft 60 is stopped when the pins 61 and 62 meet the lower ends of the slots 63 and 64. It is to be understood that the bottom of the shaft 60 is integrally joined to the top end of the shaft 28 in FIG. 2 and that the bottom of the tube 59 is integrally united with the top of the tube 45 shown in FIG. 2.

A first reservoir, or receptacle, 65 is securely fastened to the left side of the air chamber 51 and is partly filled with water 66. The top of the reservoir 65 is provided with a short duct 67 which extends to the top portion 53 of the air chamber 51 to permit the interchange of air between the upper portion 68 of the reservoir 65 and the upper air chamber 53. The bottom of the reservoir 65 is equipped with another duct 69 having slots 70 cut in its lower end. This duct 69 is supplied with a valve 71 which is normally held closed against the lower opening of the duct 69 by means of a suitable spring 72. The outer end of the valve 71 is coupled by a short cord 73 to the left pin 61. Accordingly, when the shaft 60 is moved down by the repeater 2, the pin 61 will travel downward in its associated slot 63. This will cause the cord 73 to pull the valve 71 downward thus permitting the surrounding sea water to pass through the slots 70 and then through the duct 69 into the reservoir 65.

A somewhat similar reservoir 74 is attached to the right side of the air chamber 51 and is partly filled with water 75. The upper portion 76 of this reservoir 74 is coupled to the lower portion 54 of the air chamber 51 by a long duct 77 which extends upward from the top of the reservoir 74 and then travels downward behind the air chamber 51 and finally passes through the bottom wall of the air chamber 51. Another duct 78 extends downward from the bottom of the reservoir 74 and terminates in an end portion having slots 79 similar to the slots 70 in the end portion of the duct 69. This end portion of the duct 78 is equipped with a spring-biased valve 80 which corresponds to the valve 71. This valve 80 is coupled by a short cord 81 to the pin 62. Thus, when the shaft 60 slides upward inside the tube 59, the pin 62 will also move upward thereby causing its associated cord 81 to pull the valve 80 to its open position. This action will enable the environmental sea water to enter the slots 70 and to pass through the duct 78 into the reservoir 74. It should be noted that the valves 71 and 80, which may be considered as being the input to the servo device 50, are coupled to the repeater 2 by means including the cords 73 and 81, pins 61 and 62, shafts 60 and 28, cup 26, bearing 25, line 24, and collar 22.

The method of operation of the servo device 50 will now be explained by first assuming that the repeater 2 shown in FIG. 2 is sinking faster than the cable 1. Under this condition, the repeater 2 will have dropped in position relative to the positions of the grips 17 and 18, with the result that the line 24 will have correspondingly pulled down the lower end of the shaft 28. Since, as was stated above, the shaft 28 is now understood to be integrally connected to the shaft 60 shown in FIG. 4, the shaft 60 will also have been pulled downward. This downward movement of the shaft 60 functions as a signal to the servo device 50 to indicate that the drag force of the parachute 3 should now be increased.

When the shaft 60 moves down, it carries with it the pin 61 which pulls its associated cord 73 taut thereby opening the valve 71. Due to the pressure of the environmental sea water, the sea water will enter the slots 70 and will be forced through the duct 69 so as to enter into the reservoir 65 thereby raising the level of the water 66. This, in turn, forces some of the air in the upper portion 68 of the reservoir 65 to pass through the duct 67 into the upper air chamber 53 above the piston 52. Accordingly, the air in the upper chamber 53 becomes compressed and thereby drives the piston 52 and its associated piston rod 56 downward. Leakage of either air or water is prevented by the seals 55 and 58 which were described above.

Since the rod 56 is integrally connected with the shaft 28 shown in FIG. 3, the above-described action will cause the shaft 28 to be pulled downward in relation to its associated tube 45. The shroud rings 5 and 6, which are attached to the shaft 28 by lines 7 and 8, will consequently move down in respect to the oppositely disposed pair of shroud rings 11 and 12. This permits the rings 11 and 12 to move outward so as to spread farther apart thereby increasing the cross-sectional area of the parachute 3 and thus producing an increase in its drag force. Accordingly, the sinking velocity of the repeater 2 will be reduced until its rate of descent matches that of the cable 1.

When this state of equilibrium occurs, the shaft 60 will return to its neutral position, shown in FIG. 4, thereby releasing the tension on the cord 73. This permits the spring 72 to close the valve 71 so as to prevent further influx of the sea water.

The servo device 50 remains in this neutral condition until another change occurs in the relative sinking rates of the cable 1 and the repeater 2. Let it now be assumed that the repeater 2 begins to sink more slowly than the cable 1 so that the grips 17 and 18, shown in FIG. 2, drop in respect to the repeater 2. The lines 35 and 36 will consequently pull the tube 45 downward in relation to the shaft 28. This downward movement of the tube 45 functions as a signal to the servo device 50 to indicate that the drag force of the parachute 3 should now be reduced.

Since the tube 45 and the shaft 28 are integrally joined to the tube 59 and shaft 60, respectively, that are shown in FIG. 4, the significant result of this action is that the slot 64 and the duct 78 move down in relation to the pin 62. In other words, the effect is as though the pin 62 moved upward in the slot 64. Accordingly, the cord 81 becomes taut thereby opening the valve 80. The sea water will now pass through the slots 79 and will be forced up through the duct 78 into the reservoir 74 thereby raising the level of the water 75 contained therein. This forces some of the air in the upper portion 76 of the reservoir 74 to travel down through the duct 77 into the lower air chamber 54 under the piston 52. The air in this lower chamber 54 will consequently become compressed and will drive the piston 52 and its associated rod 56 upward.

Due to the piston rod 56 being integrally connected with the shaft 28 that is shown in FIG. 3, this upward movement will result in the shaft 28 moving upward with respect to its associated tube 45. Accordingly, the shroud rings 5 and 6 will now move upward in relation to the other pair of shroud rings 11 and 12. This causes the rings 11 and 12 to become closer together by moving inward so as to contract the parachute 3. The resulting reduction in the effective cross-sectional area of the parachute 3 diminishes its drag force. Thus, the repeater 2 will now sink more rapidly until its rate of descent matches that of the cable 1.

When the sinking velocities of the cable 1 and the repeater 2 reach a state of equilibrium, the pin 62 will again be in the neutral position shown in FIG. 4. Since the tension on the cord 81 will now be removed, the spring-biased valve 80 will become closed to prevent further entrance of sea water into the duct 78. The servo device 50 is thereby restored to its normal neutral condition.

These adjusting operations can be repeated until the reservoirs 65 and 74 become filled with water. Therefore, the reservoirs 65 and 74 are made sufficiently large so that the necessary number of control operations can be performed before they become filled. It should be understood, of course, that no further adjusting operations are required after the cable 1 and the repeater 2 arrive at the ocean floor.

Figure 6:
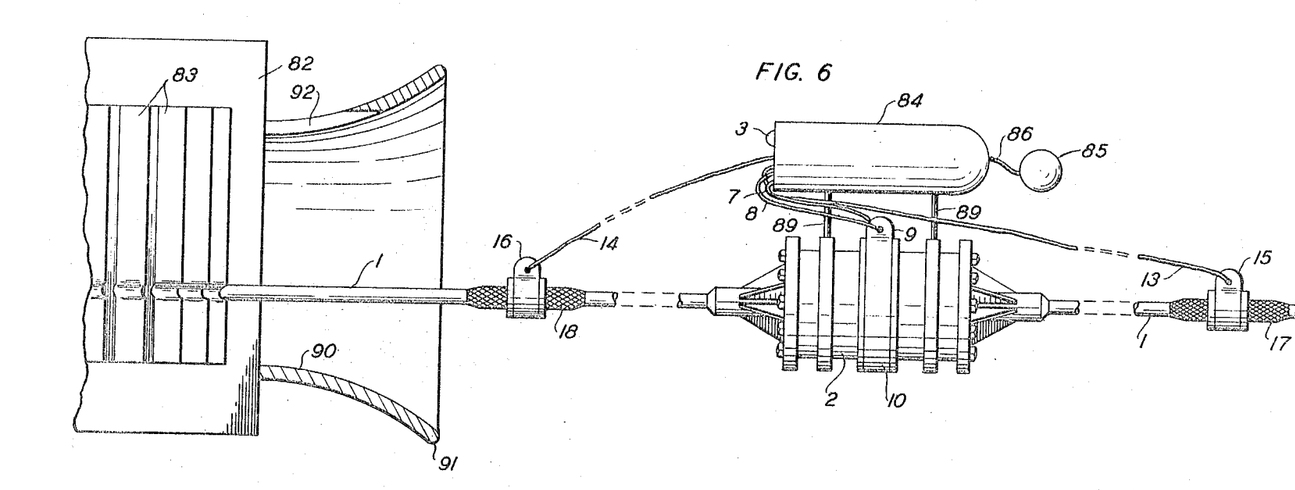
FIG. 6 is a plan view of a portion of a cable-handling engine provided with a guide assembly for directing the entrance of the furled parachute into the engine along with the associated repeater.

When armorless cable 1 is being conveyed from a cable-laying ship into the ocean, its movements are usually controlled by a cable-handling engine, such as that disclosed in Patent 2,981,454 issued Apr. 25, 1961 to F. R. Dickinson et al. An engine of this type is represented in FIG. 6 by the reference numeral 82 and its oppositely disposed tracks of cable gripper blocks are indicated by the reference numeral 83. As is stated in the Dickinson et al. patent, the engine 82 also handles the repeaters 2 without any interruption of the cable-laying process and without any reduction in the pay-out speed. Therefore, in order to maintain the continuity of these operations, it is desirable that each parachute 3 accompanying its associated repeater 2 through the engine 82.

Figure 5:
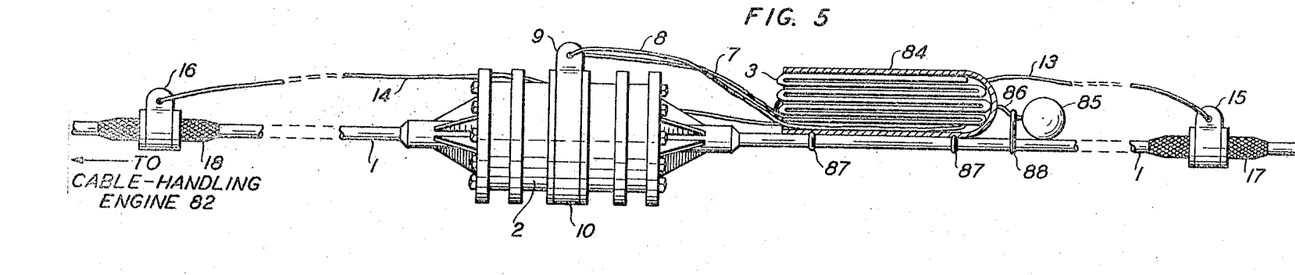
FIG. 5 is a plan view showing the manner in which the parachute may be furled and coupled to the cable in preparation for being launched into the water.

Accordingly, the parachute 3 is furled by folding it inside a protective jacket 84 as is represented in FIG. 5. The end of the jacket 84 has a buoyancy device, such as a balloon 85 attached thereto by a short cord 86. The furled parachute 3 may be attached to the cable 1 and the repeater 2 at any suitable time prior to the actual launching of the repeater 2. For example, just before the repeater 2 is connected integrally into the cable 1 by splicing, the grips 17 and 18 with their associated tabs 15 and 16 are placed over the severed ends of the cable 1. Also, at this time, the strap 10 and its tab 9 are fastened around the center of the repeater 2. After the repeater 2 is spliced into the cable 1, it is placed in a stowage rack adjacent to a cable pay-out trough similar to the rack 30 and trough 31 illustrated in Patent 2,973,919 issued Mar. 7, 1961 to R. J. Goldrick et al.

At a suitable point in time in advance of the time for actually overboarding a repeater 2, the repeater 2 is taken out of the stowage rack and is placed in the guide trough. The lines 7, 8, 13, and 14 extending from the furled parachute 3 are then attached to the respectively associated tabs 9, 15, and 16. In order for the parachute 3 to follow the repeater 2 through the cable-handling engine 82, its jacket 84 is coupled to the cable 1 by any suitable means, such as split rings 87. Another split ring 88 is used to couple the cord 86 to the cable 1 for restraining the buoyancy device 85. To insure that the parachute 3 and the buoyancy device 85 will pass smoothly between the oppositely disposed tracks of cable gripper blocks 83, the jacket 84 and the device 85 are positioned immediately behind the repeater 2.

When the assembly shown in FIG. 5 is launched into the ocean, the resistance of the water combined with the buoyancy of the device 85 cause the protective jacket 84 to move upward. Since the parachute is coupled to the cable 1 and the repeater 2 by the lines 7, 8, 13, and 14, it is prevented from moving upward and is consequently pulled out of the jacket 84. This causes the parachute 3 to become unfurled and it now assumes the position shown in FIG. 1 for automatically controlling the rate of descent of the repeater 2 in the manner described above so that it will sink at the same rate as the cable 1.

Figure 7:
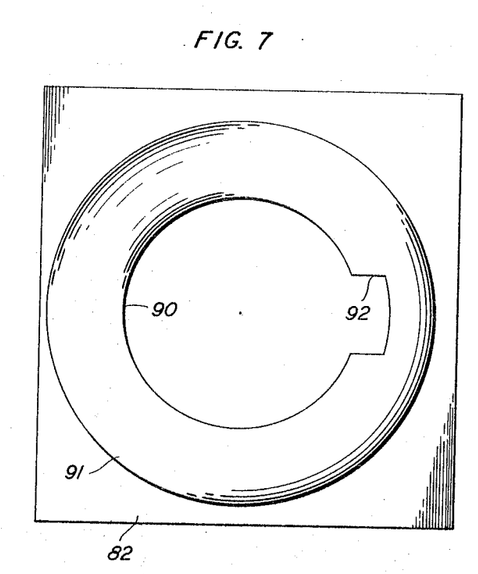
FIG. 7 is a front view of the input end of the cable-handling engine and its guide assembly.

An alternative method of conveying the furled parachute 3 through the cable-handling engine 82 is illustrated in FIG. 6. In accordance with this method, the repeater 2 is provided with a suitable guide assembly comprising arms 89 attached thereto in any convenient manner. These arms 89 are also attached to the furled parachute 3, which is enclosed in a protective jacket 84 having a buoyancy device 85 attached thereto as was described above. With this construction, the arms 89 serve to orient the furled parachute 3 alongside the repeater 2. Thus, the parachute 3 can move with the repeater 2 through the engine 82 since the cable gripper blocks 83 in the oppositely disposed tracks become spaced apart from each other during the movement of the repeater 2 therebetween as is explained in the above-mentioned Dickinson et al. Patent. The input end of the engine 82 is provided with an entry guide 90 having a lily-type flare 91. The main body of the entry guide 90 should have the form of a horizontally disposed keyhole slot 92, as is indicated in FIG. 7, for insuring that the parachute 3 will be properly oriented alongside the repeater 2 for their passage through the engine 82.

It was stated above that the equipment embodying this invention is not limited solely to use with housing structures containing repeaters because it is equally applicable to use for controlling the rate of descent of other devices, such as housing structures which contain equalizers. Therefore, instead of employing the specific words "repeater" or "equalizer" in the claims appended hereto, the generic term "lump" is used to identify the enlargement connected into the cable as recited in the claims.

What is claimed is:

1. Equipment for controlling the rate of descent of a lump through a body of water for causing it to sink at the same rate as a cable having one portion connected to one side of said lump and another portion connected to an opposite side of said lump,
    said lump being heavy with respect to said cable and normally tending to have a faster rate of descent than said cable,
    said equipment comprising a parachute connected to both of said portions of said cable,
    and regulating means connected to said lump and to said parachute for varying the effective area of said parachute for controlling its drag force,
    said regulating means being responsive to fluctuations in the relative positions of said lump and said cable during their descent through the water.

2. Equipment for controlling the rate of descent of a lump through a body of water for causing it to sink at the same rate as a cable having one portion connected to one side of said lump and another portion connected to an opposite side of said lump,
    said lump being heavy with respect to said cable and normally tending to have a faster rate of descent than said cable,
    said equipment comprising a parachute connected to both portions of said cable,
    and regulating means connected to said lump and to said parachute for varying the effective area of said parachute for controlling its drag force,
    said regulating means being responsive to fluctuations in the relative positions of said lump and said cable during their descent through the water,
    said regulating means including holding means for holding said lump for free rotation independently of rotation of said parachute,
    said holding means comprising a sleeve bearing encircling said lump and fixedly attached thereto,
    a collar loosely retained by said sleeve bearing for rotation therein,
    and linking means for connecting said collar to said parachute.

3. Equipment for controlling the rate of descent of a lump through a body of water for causing it to sink at the same rate as a cable having one portion connected to one side of said lump and another portion connected to an opposite side of said lump,
    said lump being heavy with respect to said cable and normally tending to have a faster rate of descent than said cable,
    said equipment comprising a parachute,
    means for connecting said parachute to both of said portions of said cable,
    regulating means having means connected to said parachute and to said lump for varying the effective area of said parachute for controlling its drag force,
    and operating means for adjusting said regulating means in accordance with fluctuations in the relative positions of said lump and said cable during their descent through the water.

4. Equipment in accordance with claim 3 wherein said operating means comprise sensing means for sensing the occurrence of any of said fluctuations,
    and means for operatively connecting said sensing means to said lump and to said cable and also to said parachute for effecting the operation of said operating means in accordance with said fluctuations.

5. Equipment in accordance with claim 3 wherein said operating means comprise sensing means for sensing the occurrence of any of said fluctuations,
    said sensing means including a pneumatic-hydraulic servo device,
    said servo device having an input and an output,
    means for coupling the input of said servo device to said lump and to said cable for operating said servo device in accordance with fluctuations in the relative positions of said lump and said cable during their descent through the water,
    and means for coupling the output of said servo device to said parachute for effecting adjustments in the effective area of said parachute for varying its drag force.

6. Equipment for controlling the rate of descent of a lump through a body of water for causing it to sink at the same rate as a cable having one portion connected to one side of said lump and another portion connected to an opposite side of said lump,
    said lump being heavy with respect to said cable and normally tending to have a faster rate of descent than said cable,
    said equipment comprising a parachute,
    means for connecting said parachute to both of said portions of said cable,
    regulating means having means connected to said parachute and to said lump for varying the effective area of said parachute for controlling its drag force,
    and operating means for adjusting said regulating means in accordance with fluctuations in the relative positions of said lump and said cable during their descent through the water,
    said operating means comprising sensing means for sensing the occurrence of any of said fluctuations,
    said sensing means including a pneumatic-hydraulic servo device,
    said servo device having an input and an output,
    means for coupling the input of said servo device to said lump and to said cable for operating said servo device in accordance with fluctuations in the relative positions of said lump and said cable during their descent through the water, and means for coupling the output of said servo device to said parachute for effecting adjustments in the effective area of said parachute for varying its drag force, said pneumatic-hydraulic servo device including a piston for adjusting said regulating means, first pneumatic means for driving said piston in one direction for adjusting said regulating means to effect the production of more drag force of said parachute, second pneumatic means for driving said piston in another direction for adjusting said regulating means to effect a reduction of drag force of said parachute, first hydraulic means for operating said first pneumatic means, said first hydraulic means being responsive to a dropping of said lump in relation to said cable, and second hydraulic means operating said second pneumatic means, said second hydraulic means being responsive to a dropping of said cable in relation to said lump.

7. Equipment for lowering a lump through a body of water to the bottom thereof, said lump being connected into a cable with one end of said lump connected to a first section of said cable and another end of said lump connected to a second section of said cable, said lump being heavy with respect to said cable, said equipment comprising a parachute, coupling means for coupling said parachute to said lump, and control means for controlling the rate of descent of said lump through the water for causing it to sink at the same rate as said cable, said control means comprising regulating means responsive to changes in the relative positions of said first and second cable portions with respect to said lump during their descent through the water for varying the effective area of said parachute for controlling its drag force, said regulating means including instrumentalities for separately coupling each of said first and second cable portions of said parachute.

8. Equipment in accordance with claim 7 wherein said instrumentalities include means for holding said cable for independent rotation about its axis, and wherein said coupling means include means for holding said lump for independent rotation about its axis, and further comprising means for facilitating rotation of said parachute about its axis independently of said lump and said cable.

9. Equipment for lowering a lump through a body of water to the bottom thereof, said lump being connected into a cable with one end of said lump connected to a first section of said cable and another end of said lump connected to a second section of said cable, said lump being heavy with respect to said cable, said equipment being characterized by having control means for controlling the rate of descent of said lump through the water for causing it to sink at the same rate as said cable, said control means comprising a parachute provided with rigging including a number of shrouds, said shrouds being divided into four groups with a first pair of said groups being oppositely disposed with respect to each other along certain portions of the periphery of said parachute and a second pair of said groups also being oppositely disposed with respect to each other along other portions of the periphery of said parachute, coupling means for coupling said first pair of groups of shrouds to said lump, first connecting means for connecting one group of shrouds in said second pair to said first cable section, and second connecting means for connecting the other group of shrouds in said second pair to said second cable section.

10. Equipment in accordance with claim 9 wherein said first and second connecting means each comprise holding means for holding said cable for free rotation independently of rotation of said parachute, each of said holding means including a sleeve bearing encircling a respectively different one of said first and second cable sections and fixedly attached thereto, two collars, each of said sleeve bearings having means for loosely retaining a respectively different one of said collars for rotation therein, and attaching means for attaching each of said collars to said parachute.

11. Equipment in accordance with claim 9 wherein said coupling means comprise instrumentalities for facilitating rotation of said parachute about its axis independently of said lump, said instrumentalities including a shaft, means for connecting one end of said shaft to said first pair of groups of shrouds, a bearing having one portion connected to said lump, and means secured to another end of said shaft for loosely retaining said bearing for rotation thereof.

12. Equipment in accordance with claim 9 and further comprising instrumentalities for facilitating rotation of said parachute about its axis independently of said cable, said instrumentalities including a shaft, a cylinder loosely surrounding said shaft for both axial and rotational movement thereabout, means for limiting the extent of axial movement of said cylinder in each direction along said shaft, means for connecting one end of said shaft to said first pair of groups of shrouds, means for connecting another end of said shaft to said lump, means for connecting one end of said cylinder to said second pair of groups of shrouds, and means for connecting another end of said cylinder to said first and second cable sections.

References Cited

UNITED STATES PATENTS

| | | | |
|---|---|---|---|
| 1,685,422 | 9/1928 | Hurlburt | 244—152 |
| 2,458,264 | 1/1949 | Hart | 244—152 |
| 2,730,317 | 1/1956 | Onamian | 244—152 |
| 3,125,859 | 3/1964 | Dilbey | 61—72.3 |
| 3,136,529 | 6/1964 | Dickinson et al. | 254—134.3 |
| 3,146,976 | 9/1964 | Houdou | 244—152 |

FOREIGN PATENTS 1,199   1863   Great Britain.

EARL J. WITMER, *Primary Examiner.*